United States Patent
Yoshizawa

(10) Patent No.: US 12,541,812 B2
(45) Date of Patent: *Feb. 3, 2026

(54) PICTURE DISPLAY DEVICE, AND SETTING MODIFICATION METHOD AND SETTING MODIFICATION PROGRAM THEREFOR

(71) Applicant: Maxell, Ltd., Kyoto (JP)

(72) Inventor: Kazuhiko Yoshizawa, Ibaraki (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,701

(22) Filed: Oct. 17, 2023

(65) Prior Publication Data
US 2024/0046405 A1 Feb. 8, 2024

Related U.S. Application Data

(63) Continuation of application No. 17/536,171, filed on Nov. 29, 2021, now Pat. No. 11,823,304, which is a (Continued)

(51) Int. Cl.
G06T 1/20 (2006.01)
G06F 21/31 (2013.01)
(Continued)

(52) U.S. Cl.
CPC ............... *G06T 1/20* (2013.01); *G06F 21/31* (2013.01); *G06V 40/168* (2022.01);
(Continued)

(58) Field of Classification Search
None
See application file for complete search history.

(56) References Cited

U.S. PATENT DOCUMENTS 6,400,835 B1   6/2002 Lemelson et al.
7,602,947 B1   10/2009 Lemelson et al.
(Continued)

FOREIGN PATENT DOCUMENTS

CN   102469373 A   5/2012
EP   2518917 A1   10/2012
(Continued)

OTHER PUBLICATIONS

Japanese Office Action received in corresponding Japanese Application No. 2023-033676 dated Nov. 21, 2023.
(Continued)

*Primary Examiner* — Yingchun He
(74) *Attorney, Agent, or Firm* — MATTINGLY & MALUR, PC

(57) ABSTRACT

A picture display apparatus able to display content includes a network interface that can communicate with a portable terminal via a first network and acquire the content via a second network, and further includes a controller and a display capable of displaying the content and a content list of the content capable of being acquired via the second network. The content list settings information and operator information are stored in a storage in association with each other. When the controller determines that operator information acquired from the portable terminal is not operator information related to an operator stored in the storage, but instead is operator information regarding a new operator, the controller performs a control that enables processing to newly store operator information about the new operator in the storage without displaying, on the display, a content list based on content list settings information corresponding to operator information.

9 Claims, 10 Drawing Sheets

Related U.S. Application Data continuation of application No. 16/109,838, filed on Aug. 23, 2018, now Pat. No. 11,227,356, which is a continuation of application No. 15/596,377, filed on May 16, 2017, now Pat. No. 10,097,900, which is a continuation of application No. 14/429,995, filed as application No. PCT/JP2012/081019 on Nov. 30, 2012, now Pat. No. 9,665,922.

(51) Int. Cl.

| | | |
|---|---|---|
| G06V 40/16 | (2022.01) | |
| G09G 5/00 | (2006.01) | |
| H04N 21/422 | (2011.01) | |
| H04N 21/441 | (2011.01) | |
| H04N 21/4415 | (2011.01) | |
| H04N 21/442 | (2011.01) | |
| H04N 21/485 | (2011.01) | |

(52) U.S. Cl.
CPC ............. *G06V 40/172* (2022.01); *G09G 5/00* (2013.01); *H04N 21/42203* (2013.01); *H04N 21/42204* (2013.01); *H04N 21/4415* (2013.01); *H04N 21/44218* (2013.01); *H04N 21/485* (2013.01); *G06V 40/16* (2022.01); *G09G 2320/08* (2013.01); *G09G 2354/00* (2013.01); *H04N 21/441* (2013.01)

(56) References Cited

U.S. PATENT DOCUMENTS

| | | | |
|---|---|---|---|
| 9,262,901 | B1 | 2/2016 | Mona |
| 2002/0130846 | A1 | 9/2002 | Nixon et al. |
| 2003/0142849 | A1 | 7/2003 | Lemelson et al. |
| 2004/0234109 | A1 | 11/2004 | Lemelson et al. |
| 2006/0057550 | A1 | 3/2006 | Sahashi |
| 2006/0072791 | A1 | 4/2006 | Gutta et al. |
| 2006/0193502 | A1 | 8/2006 | Yamaguchi |
| 2006/0218120 | A1* | 9/2006 | Juang ............... G06Q 10/10 |
| 2007/0011196 | A1 | 1/2007 | Ball et al. |
| 2007/0106941 | A1 | 5/2007 | Chen et al. |
| 2007/0126873 | A1 | 6/2007 | Xu et al. |
| 2007/0126884 | A1 | 6/2007 | Xu et al. |
| 2007/0200916 | A1 | 8/2007 | Han |
| 2007/0201824 | A1 | 8/2007 | Masaki et al. |
| 2008/0020806 | A1 | 1/2008 | Iwase |
| 2008/0235731 | A1 | 9/2008 | Bryant et al. |
| 2009/0091420 | A1 | 4/2009 | Dobashi et al. |
| 2009/0133051 | A1 | 5/2009 | Hildreth |
| 2009/0135269 | A1 | 5/2009 | Nozaki et al. |
| 2009/0138907 | A1 | 5/2009 | Wiser et al. |
| 2009/0148006 | A1 | 6/2009 | Yayasaki et al. |
| 2009/0273659 | A1 | 11/2009 | Lee et al. |
| 2009/0304238 | A1 | 12/2009 | Ebata et al. |
| 2010/0031162 | A1 | 2/2010 | Wiser et al. |
| 2010/0058211 | A1 | 3/2010 | Lee et al. |
| 2010/0124363 | A1 | 5/2010 | Ek et al. |
| 2010/0296707 | A1 | 11/2010 | Murakami et al. |
| 2010/0333144 | A1 | 12/2010 | Pack et al. |
| 2011/0096348 | A1 | 4/2011 | Ebi |
| 2011/0102680 | A1 | 5/2011 | Kobayashi |
| 2011/0107215 | A1 | 5/2011 | Klappert |
| 2011/0138317 | A1 | 6/2011 | Kang et al. |
| 2011/0138416 | A1 | 6/2011 | Kang et al. |
| 2011/0138444 | A1 | 6/2011 | Kang et al. |
| 2011/0140840 | A1 | 6/2011 | Hardacker et al. |
| 2011/0247031 | A1 | 10/2011 | Jacoby |
| 2012/0019447 | A1 | 1/2012 | Hanes |
| 2012/0124615 | A1* | 5/2012 | Lee ................... H04N 21/482 725/30 |
| 2012/0174143 | A1 | 7/2012 | Yang et al. |
| 2012/0224043 | A1 | 9/2012 | Tsurumi |
| 2012/0316876 | A1 | 12/2012 | Jang et al. |
| 2013/0005250 | A1* | 1/2013 | Kim ................... G08C 23/04 455/41.1 |
| 2013/0010209 | A1 | 1/2013 | Takiguchi et al. |
| 2013/0073431 | A1* | 3/2013 | Suro ................ G06Q 30/0623 705/26.61 |
| 2013/0120243 | A1 | 5/2013 | Kim et al. |
| 2013/0205312 | A1 | 8/2013 | Huang |
| 2014/0053189 | A1 | 2/2014 | Lee et al. |
| 2014/0115692 | A1 | 4/2014 | Lee et al. |
| 2014/0237589 | A1 | 8/2014 | Suggs et al. |
| 2015/0199969 | A1 | 7/2015 | Choi et al. |

FOREIGN PATENT DOCUMENTS

| | | |
|---|---|---|
| JP | 2000-115098 A | 4/2000 |
| JP | 2001-016514 A | 1/2001 |
| JP | 2002-024250 A | 1/2002 |
| JP | 2003-219287 A | 7/2003 |
| JP | 2004-32258 A | 1/2004 |
| JP | 2004-96204 A | 3/2004 |
| JP | 200494158 A | 3/2004 |
| JP | 2004-240839 A | 8/2004 |
| JP | 2005-130912 A | 5/2005 |
| JP | 2005-157894 A | 6/2005 |
| JP | 2005-266421 A | 9/2005 |
| JP | 2006-100881 A | 4/2006 |
| JP | 2006-324809 A | 11/2006 |
| JP | 2007-21808 A | 2/2007 |
| JP | 2007-025898 A | 2/2007 |
| JP | 2007-147828 A | 6/2007 |
| JP | 2007193138 A | 8/2007 |
| JP | 2008-065721 A | 3/2008 |
| JP | 2008134992 A | 6/2008 |
| JP | 2008-282084 A | 11/2008 |
| JP | 2009-135700 A | 6/2009 |
| JP | 2009-187281 A | 8/2009 |
| JP | 2010-124391 A | 6/2010 |
| JP | 2010-524281 A | 7/2010 |
| JP | 2011-077965 A | 4/2011 |
| JP | 2011-90128 A | 5/2011 |
| JP | 2011-229135 A | 11/2011 |
| JP | 2011-259384 A | 12/2011 |
| JP | 2012-160918 A | 8/2012 |
| JP | 2012-222586 A | 11/2012 |
| WO | 2004/029905 A1 | 4/2004 |
| WO | 2011037761 A1 | 3/2011 |

OTHER PUBLICATIONS

Japanese Office Action received in corresponding Japanese Application No. 2014-549716 dated Mar. 31, 2015.

Japanese Office Action received in corresponding Japanese Application No. 2015-143668 dated Aug. 2, 2016.

Extended European Search Report received in corresponding European Application No. 12889136.3 dated Sep. 24, 2015.

Japanese Office Action received in corresponding Japanese Application No. 2018-196684 dated Oct. 8, 2019.

Japanese Office Action received in corresponding Japanese Application No. 2018-196684 dated Dec. 7, 2021.

Japanese Office Action received in corresponding Japanese Application No. 2024-132041 dated Oct. 21, 2025.

* cited by examiner

PICTURE DISPLAY DEVICE, AND SETTING MODIFICATION METHOD AND SETTING MODIFICATION PROGRAM THEREFOR

TECHNICAL FIELD

The present invention relates to a technique for changing settings in a picture display device.

BACKGROUND ART

In general, a picture display device such as a television device enables a user thereof to adjust the picture quality such as brightness, contrast, and tint, in accordance with the user's preference. However, when the user tries to adjust the picture quality of the picture display device, the user has to manually change respective setting values while confirming a picture displayed on the picture display device, and therefore time and labor are required. As a method for reducing this time and labor, there is a technique described in the Patent Literature 1 as shown below.

The following Patent Literature 1 describes a technique that "in a state where a picture quality adjustment screen showing N sample images having different picture quality parameters is displayed on the display unit, where N is an integer equal to or larger than 3, when two sample images are selected, the picture quality adjustment screen is changed to show N or less than N sample images having picture quality parameter values between the values of the two sample images; and in a state where the picture quality adjustment screen showing N or less than N sample images is displayed on the display unit, when one sample image is selected, the value of the picture quality parameter of the image displayed on the display unit is set to the value of the selected sample image." By this technique, it is possible to easily set the picture quality in accordance with the selected sample image.

CITATION LIST

Patent Literature

PTL 1: Japanese Unexamined Patent Application Publication No. 2007-147828

SUMMARY OF INVENTION

Technical Problem

In a case where a picture display device is a television device placed in the living room, for example, it is considered that the user is not limited, and a plurality of users share the picture display device. In a case there are a plurality of users and the preference of the settings such as the picture quality is different between the users, each user has to choose either to use the picture display device while accepting the settings that do not match the preference thereof or to change the settings of the picture quality or the like every time that user uses the picture display device. Thus, usability is not good.

In the aforementioned situation, it is desirable that the picture display device identifies each user and automatically changes its settings in accordance with the identified user. However, Patent Literature 1 described above does not consider the aforementioned problem. Moreover, also in a case where the picture display device has a function of recording digital broadcast programs or the like and displays a list or table of recorded programs, for example, the picture display device can have improved usability by being configured to identify the respective users and automatically set a manner of displaying the content corresponding to the identified user.

It is an object of the present invention to provide a picture display device having improved usability even in a case the picture display device is shared by a plurality of users, considering the aforementioned problems.

Solution to Problem

As a solution of the aforementioned problems, according to the present invention, a picture display device, a setting modification method therefor, and a setting modification program therefor recited in the claims may be used, for example.

In an example, a picture display device may be configured to include: an individual information storage unit which stores information related to a settings change applied to the picture display device and information related to an operator instructing the settings change to the picture display device as individual settings information and operator information, respectively, so that they are associated with each other; an operator identification unit which identifies an operator operating the picture display device; an operator confirmation unit which confirms whether or not information of the operator operating the picture display device identified by the operator identification unit coincides with the operator information stored in the individual information storage unit; and a control unit which, in a case where as a result of a confirmation process in the operator confirmation unit, the information on the operator operating the picture display device, identified by the operator identification unit, coincides with the operator information stored in the individual information storage unit, reads out the individual settings information stored in the individual information storage unit in association with the operator information and applies the settings change based on the individual settings information thus read out to the picture display device.

Advantageous Effects of Invention

By using the technique of the present invention, a picture display device having improved usability can be provided even in a case the picture display device is shared by a plurality of users.

DESCRIPTION OF EMBODIMENTS

Exemplary embodiments of the present invention are described below, using the drawings.

Figure 1:
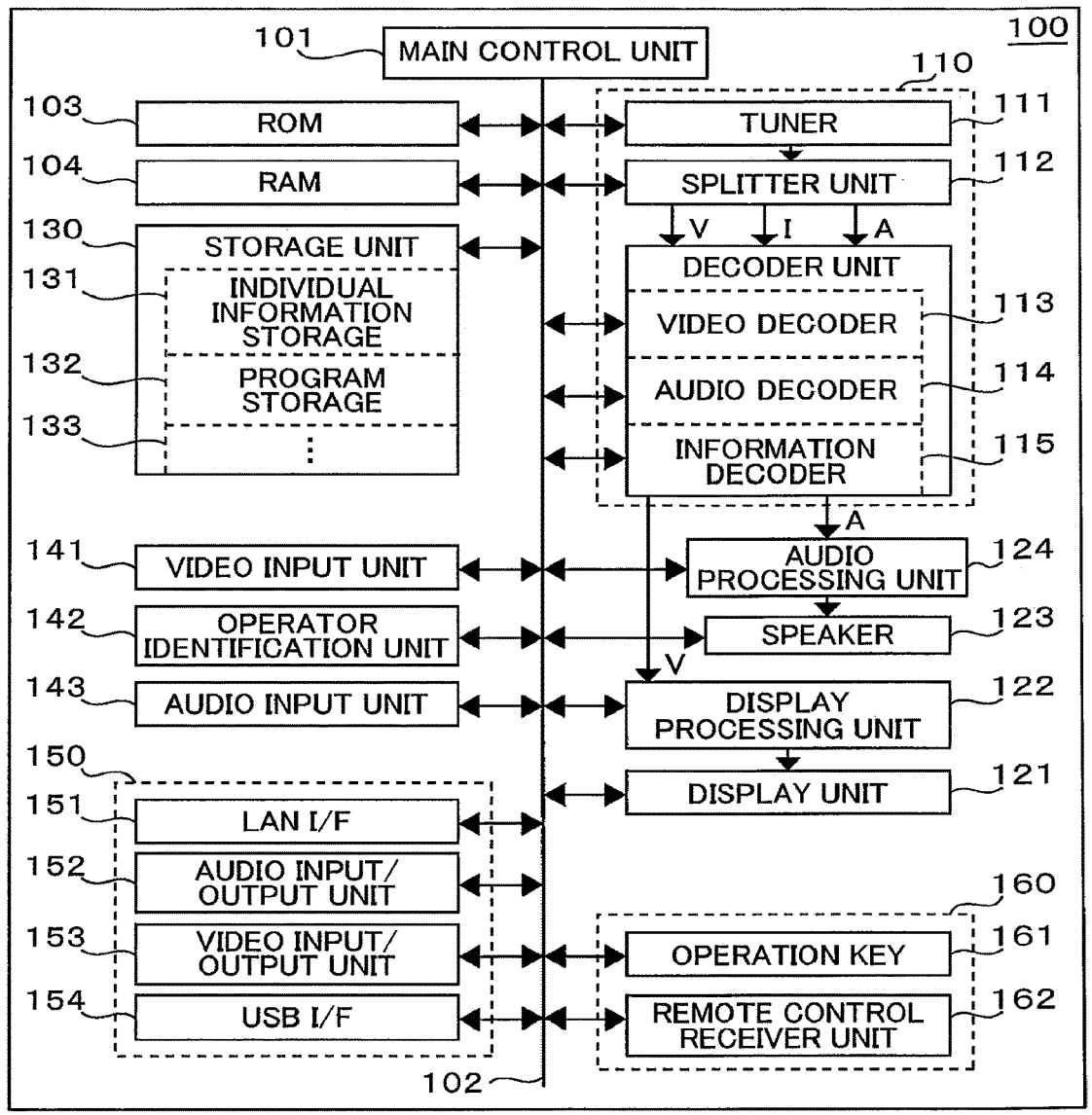
FIG. 1 is a block diagram of a picture display device according to an example.

FIG. 1 is a block diagram of a picture display device according to this example. The picture display device 100 includes a main control unit 101, a system bus 102, a ROM 103, a RAM 104, a broadcast receiver unit 110, a display unit 121, a display processing unit 122, a speaker 123, an audio processing unit 124, a storage unit 130, a video input unit 141, an operator identification unit 142, an audio input unit 143, an external interface 150, and an operation unit 160.

The picture display device 100 may be a television device with a recording function which includes therein a function of recording and reproducing a digital broadcast program, or may be a television device supporting recording which does not include therein the recording and reproducing function but enables a digital broadcast program to be recorded or reproduced on/from a HDD (Hard Disk Drive) device or the like externally connected thereto. Moreover, the picture display device 100 may be an internet supporting television device capable of displaying a picture content accumulated in a content server connected to a network such as the Internet. The picture display device 100 may be a tablet terminal, a desktop/portable PC (Person Computer), a game player or the like which has a digital broadcast receiving function and a function of recording and reproducing a received digital broadcast program. The picture display device 100 may be a tablet terminal, a desktop/portable PC, or a game player, for example, which is capable of displaying a picture content accumulated in a content server connected to a network such as the Internet. Furthermore, the picture display device 100 may be a combination of a recording and reproducing apparatus such as a HDD recorder or a BD (Blu-ray Disc) recorder and a monitor device. The picture display device 100 may be a combination of a STB (Set Top Box) capable of receiving a digital broadcast and/or receiving a picture content accumulated in a content server connected to a network such as the Internet, and a monitor device. The picture display device 100 may be a display device with a touch panel capable of displaying and outputting a figure and a character input by means of the touch panel.

The main control unit 101 is a microprocessor unit which controls the entire picture display device 100 in accordance with a predetermined program. The system bus 102 is a data communication path for data transmission and reception between the main control unit 101 and the respective portions in the picture display device 100. The ROM (Read Only Memory) 103 is a memory in which a basic operation program of the picture display device 100 such as an operating system or a predetermined application program is stored, and a rewritable ROM such as EEPROM (Electrically Erasable Programmable ROM) or a flash ROM is used, for example. It is possible to upgrade the version of the basic operation program or expand features thereof by updating the program stored in the ROM 103. The ROM 103 may use a portion of a storage area in the storage unit 130 described later, instead of being configured independently, as shown in FIG. 1. The RAM (Random Access Memory) 104 is a working area during execution of the basic operation program or each application. The ROM 103 and the RAM 104 may be integrally configured with the main control unit 101.

The broadcast receiver unit 110 receives a digital broadcast wave and performs signal processing such as decoding. Especially, a tuner 111 extracts a signal of a channel selected by a user who operates the picture display device 100 from a broadcast wave received by an antenna which is not shown, and demodulates a TS (Transport Stream) signal. A splitter 112 splits the TS signal into video data, audio data, and associated information data each of which is packetized, and outputs the video data to a video decoder 113, the audio data to an audio decoder 114, and the associated information data to an information decoder 115. The video decoder 113 decodes the video data output from the splitter 112, and outputs a video signal to the display processing unit 122. The audio decoder 114 decodes the audio data output from the splitter 112, and outputs an audio signal to the audio processing unit 124. The information decoder 115 processes the associated information data output from the splitter 112, and especially acquires SI (Service Information) information including program information such as a program name, a genre, and start and end date and time of broadcasting of each program, for example.

The display unit 121 is a display device such as a liquid crystal panel, for example, and provides the video signal processed by the display processing unit 122 to the user of the picture display device 100. The display processing unit 122 also performs format conversion, a process of superimposing a menu or other OSD (On Screen Display) signal, or the like for the video signal input thereto, as necessary. The speaker 123 provides the audio signal processed by the audio processing unit 124 to the user of the picture display device 100.

The storage unit 130 is used for storing values of various operation settings of the picture display device 100, information of the user of the picture display device 100, and various applications operated in the picture display device 100, and is also used for recording a digital broadcast program, for example. The storage 130 is formed by an individual information storage area 131 for storing operator information of the picture display device 100, information related to individual settings for each operator, and the like, a program storage area 132 for recording a digital broadcast program therein and storing information related to the recording of the digital broadcast program (e.g., reservation information), and a storage area for other information 133.

All or some of the functions of the ROM 103 can be replaced with a portion of the other information storage area 133. The picture display device 100 can expand its feature by downloading a new application from an application server connected to a network such as the Internet. In this case, the downloaded new application is stored in the other information storage area 133. By expansion of the new application stored in the other information storage area 133 onto the RAM 104 and execution of it, the picture display device 100 can implement a number of types of new functions.

The storage unit 130 needs to hold stored information even in a state where no power is supplied to the picture display device 100. Therefore, a device such as a flash ROM, SSD (Solid State Drive), or HDD is used.

The video input unit 141 is a camera which inputs image data of surroundings and/or an object by converting light input through a lens into an electric signal. The video input unit 141 may be included in the picture display device 100 to be integrally configured therewith, or a separate camera may be connected to a USB interface described later. The operator identification unit 142 performs a process of identifying a person who operates the picture display device 100 or a terminal device used for operating the picture display device 100 (hereinafter, the person and the terminal device are collectively referred to as an operator) (hereinafter, referred to as an operator identification process). The details of the operator identification process will be described later. Although the operator identification unit 142 is shown as being independently configured in FIG. 1, the main control unit 101 may work to implement the same function by using the RAM 104 as a working area. The audio input unit 143 is a microphone, for example, and converts the voice of the user or the like into audio data and inputs the audio data. The audio input unit 143 may be included in the picture display device 100 to be integrally configured therewith, or a separate microphone may be connected to the USB interface described later.

The external interface 150 is a group of interfaces for expanding the functions of the picture display device 100, and is formed by a LAN (Local Area Network) interface 151, an audio input/output unit 152, a video input/output unit 153, a USB (Universal Serial Bass) interface 154 in this example. The LAN interface 151 connects to a network such as the Internet by wired or wireless communication to transmit and receive information. The LAN interface 151 includes an encoding circuit and a decoding circuit, for example. The audio input/output unit 152 and the video input/output unit 153 input an audio/video signal from an external audio/video output device and output an audio/video signal to an external audio/video input device. In a case where the picture display device 100 is a HDD recorder, a BD recorder, or a STB, a monitor device may be connected to the audio input/output unit 152 and the video input/output unit 153. The USB interface 154 performs connection with a USB device such as a keyboard or a memory card, for example. In a case where the picture display device 100 does not have a recording/reproducing function therein but records a digital broadcast program onto an HDD device or the like externally connected, the HDD device or the like may be connected to the USB interface 154.

The operation unit 160 is an instruction input unit which inputs an operation instruction to the picture display device 100, and is formed by an operation key 161 in which button switches are arranged and a remote control receiver unit 162 which receives an infrared ray signal from a remote controller in this example. In place of the operation key 161, the picture display device 100 may be operated by means of a touch panel superimposed on the display unit 121. Both may be used together. The picture display device 100 may be operated by means of a keyboard or the like connected to the USB interface 154. The picture display device 100 may be operated by means of a portable information terminal, a PC, or the like connected via the LAN interface 151 to the network.

The exemplary configuration of the picture display device 100 shown in FIG. 1 also includes a component that is not essential to the present invention, e.g., the external interface 150. Without that component, the advantages of the present invention are not spoiled. Moreover, a component such as a communication unit enabling a mobile telephone network communication, a mail transmission/reception unit, an acceleration sensor, a gyro sensor, an earth magnetic field sensor, a GPS (Global Positioning System) receiver unit may be further included.

The picture display device 100 of this example has a function of performing the operator identification process by being controlled by the operator identification unit 142 and automatically changing its settings in accordance with the identified operator.

An exemplary case is described below in which the aforementioned operator identification process is performed by inputting an image of a person who operates the picture display device 100.

Figure 2:
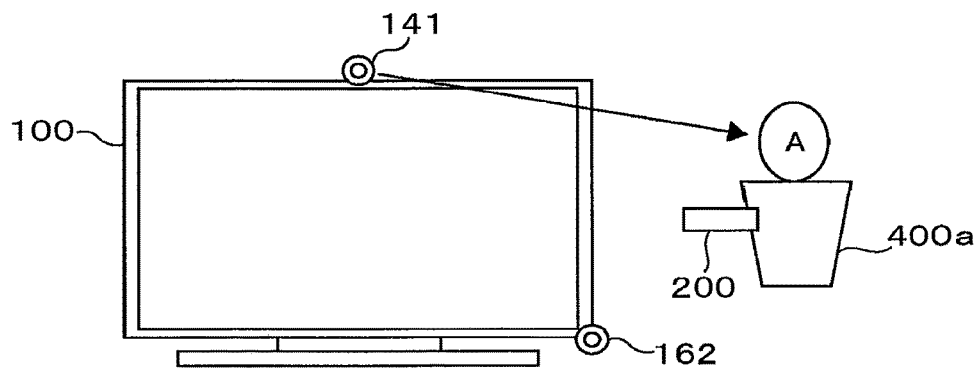
FIG. 2 is a schematic diagram of an operator identification process according to an example.

For example, in a case where a person A (400a) is an operator who operates the picture display device 100 by means of a remote controller 200, as shown in FIG. 2, first the video input unit 141 inputs an image of the person A (400a) who is the operator of the picture display device 100. Moreover, the operator identification unit 142 extracts face information (operator information) from the input image and performs a face recognition process in which the extracted face information is compared with face information stored by a user of the picture display device 100 in advance in the individual information storage area 131. In a case where the person A (400a) has already registered its face information in the individual information storage area 131, the operator identification unit 142 can identify the operator of the picture display device 100 as the person A (400a) by the aforementioned face recognition process.

Alternatively, the video input unit 141 inputs an image of the person A (400a) who is the operator of the picture display device 100, and the operator identification unit 142 extracts gesture information (operator information) of the person A (400a) from the input image and performs a gesture recognition process in which the extracted gesture information is compared with gesture information stored by a user of the picture display device 100 in advance in the individual information storage area 131. In a case where the person A (400a) has already registered its gesture information in the individual information storage area 131, the operator identification unit 142 can identify the operator of the picture display device 100 as the person A (400a) by the gesture recognition process.

In a case of performing the operator identification process using the gesture recognition process, the picture display device 100 may be configured to, after a predetermined operation, recognize that the gesture for the operator identification process has been performed. More specifically, in a case where the remote controller 200 has a "gesture input" button, for example, the gesture recognition for the operator identification process may be performed after the "gesture input" button is pressed. Alternatively, after the operator speaks a predetermined keyword (e.g., "start the gesture input") and the picture display device 100 recognizes that keyword, the operator may perform the gesture for the operator identification process and the picture display device 100 may recognize it. In this manner, the recognition efficiency in the gesture recognition process can be improved.

Figure 3:
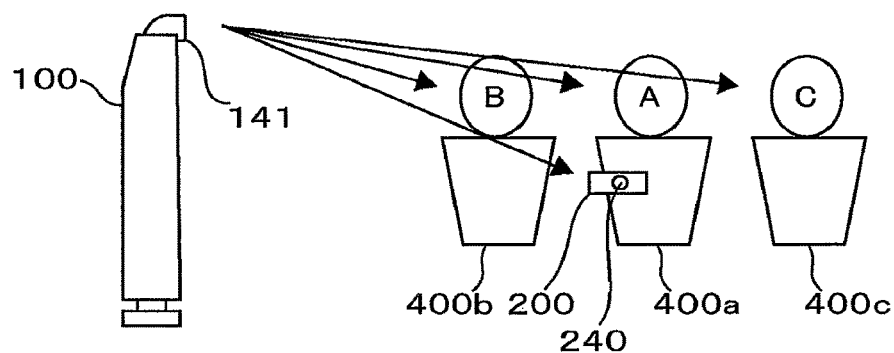
FIG. 3 is a schematic diagram of an operator identification process according to an example.

In a case where there are more than one person (a person A (400a), a person B (400b), and a person C (400c)) watching the picture display device 100, as shown in FIG. 3, the video input unit 141 inputs images of those people and detects infrared light output from a remote control transmitter unit 240 of the remote controller 200. By this configuration, the operator identification unit 142 can identify the person A (400a) holding the remote controller 200 as the operator of the picture display device 100 by extracting face images of those people and the positions of the bodies connected to those face images from the input images and analyzing the positional relationship between the face images and the body positions thus extracted and the detected infrared light. Furthermore, the operator identification unit 142 can identify the operator of the picture display device 100 as the person A (400a) by performing a face recognition process or a gesture recognition process for the identified person A (400a).

For the face recognition process and the gesture recognition process, known techniques may be used. Therefore, the detailed description thereof is omitted.

An exemplary case is described below in which the operator identification process is performed by inputting a voice uttered from a person who operates the picture display device 100.

Figure 4:
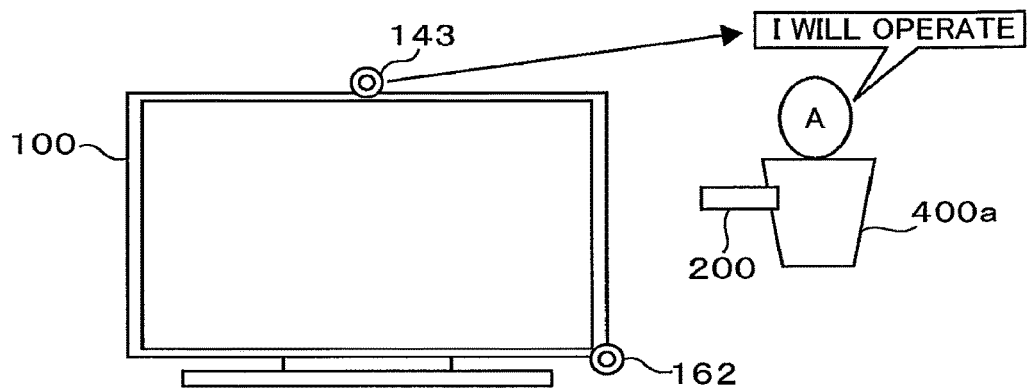
FIG. 4 is a schematic diagram of an operator identification process according to an example.
Figure 5:
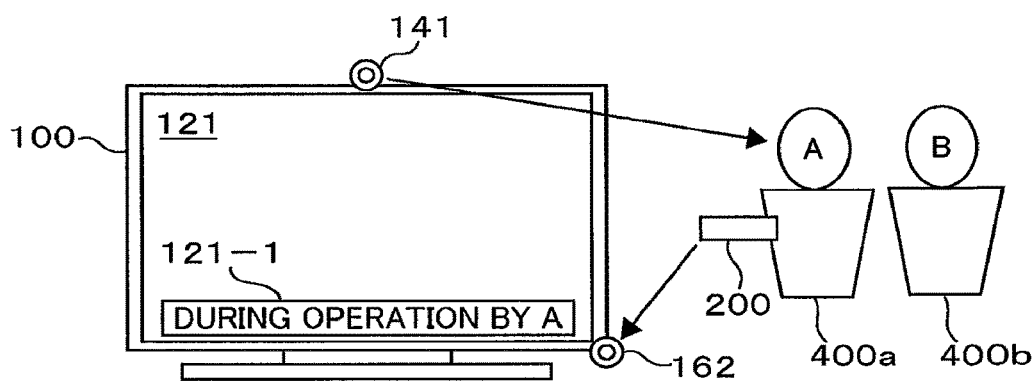
FIG. 5 is a screen diagram explaining an OSD massage for clearly showing an operator according to an example.
Figure 6:
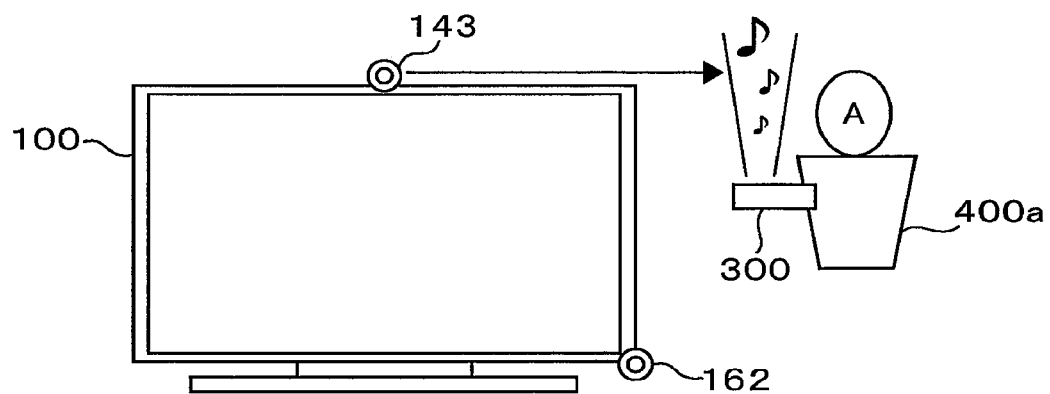
FIG. 6 is a schematic diagram explaining an operator identification process according to an example.

For example, in a case where a person A (400a) is an operator who operates the picture display device 100 by means of the remote controller 200, as shown in FIG. 4, the audio input unit 143 inputs the voice uttered by the person A (400a) who is the operator of the picture display device 100. Moreover, the operator identification unit 142 extracts predetermined keyword information (operator information) from the input voice, and performs a speech recognition process in which the extracted keyword information is compared with keyword information that a user of the picture display device 100 has stored in advance in the individual information storage area 131. In a case where the person A (400a) has already registered the keyword information determined by the person A in the individual information storage area 131, the operator identification unit 142 can identify the operator of the picture display device 100 as the person A (400a) by the speech recognition process.

The keyword information may be a phrase such as "I will operate", "operation start", or "start-up", or a name of a person or a pet, or a word such as "mountain" or "river". Moreover, in the speech recognition process, the voice quality or the like does not necessarily coincide if the keyword coincides.

Alternatively, the audio input unit 143 inputs the voice uttered by the person A (400a) who is the operator of the picture display device 100, and the operator identification unit 142 extracts voiceprint information (operator information) by performing voiceprint analysis for the input voice and carries out a voiceprint analysis process in which the extracted voiceprint information is compared with voiceprint information that a user of the picture display device 100 has stored in advance in the individual information storage area 131. In a case where the person A (400a) has already registered the voiceprint information thereof in the individual information storage area 131, the operator identification unit 142 can identify the operator of the picture display device 100 as the person A (400a) by the aforementioned voiceprint analysis process.

The voice used for the voiceprint analysis process may be a given phrase or word, but when a phrase or a word that is determined in advance (e.g., "I will operate") is used, the efficiency of analysis in the voiceprint analysis process can be improved.

For the speech recognition process and the voiceprint analysis process, known techniques may be used. Therefore, the detailed description thereof is omitted.

In a case where the person operating the picture display device 100 is a person who has registered information thereof in advance in the individual information storage area 131, when that person has performed any operation for the picture display device 100, an OSD message indicating that person is operating the picture display device 100 may be displayed.

For example, in a case where a person A (400a) who has stored its operator information in advance in the individual information storage area 131 is identified as the operator of the picture display device 100 by the operator identification process, when the person A (400a) has performed any operation for the picture display device 100, the picture display device 100 displays, on the display unit 121, an OSD message 121-1 indicating that the picture display device 100 is being operated by the person A (400a). By doing this, it is possible to clarify who is the person operating the picture display device 100, especially in a case where there are more than one person watching the picture display device 100.

A timing at which the picture display device 100 displays the OSD message 121-1 may be every time the operation of the picture display device 100 is performed, or only a timing at which a predetermined operation (e.g., an operation related to a change of the settings of the picture display device 100) is performed.

The operator identification process may be performed only at a predetermined timing (e.g., when the device 100 is turned on or resumes from its sleep state). Alternatively, the operator identification process may be performed every time the picture display device 100 receives a control command from the remote controller 200 or regularly at a predetermined time interval.

Moreover, a technique has been common these days in which a dedicated application is operated so that a portable information terminal such as a smartphone or a tablet device is used as a terminal device for operating a television device for digital broadcast reception.

An exemplary case of a case is described below in which that technique is applied and the aforementioned operator identification process is performed by inputting a sound output from a portable information terminal (a terminal device for operating the picture display device 100) owned by a person who operates the picture display device 100.

For example, in a case where a portable information terminal 300 has a function of transmitting an infrared ray signal for operating the picture display device 100 in place of the remote controller 200 and a person A (400a) is an operator who operates the picture display device 100 by means of the portable information terminal 300, first the audio input unit 143 inputs a sound that the person A (400a) who is the operator of the picture display device 100 caused the portable information terminal 300 owned thereby to generate. Then, the operator identification unit 142 performs digital sampling of the input sound to convert it into sound data (operator information), and performs a sound source analysis process in which that sound data is compared with sound data that a user of the picture display device 100 has stored in advance in the individual information storage area 131. In a case where the person A (400*a*) has already registered the sound data chosen by the person A in the individual information storage area 131, the operator identification unit 142 can identify the operator of the picture display device 100 as the person A (400*a*) by the aforementioned sound source analysis process.

As the sound data, a cry of an animal, a sound generated by musical instrument performance, a popular song or the like may be used. Moreover, as for the sound source analysis process, a known technique may be used. Therefore, the detailed description thereof is omitted.

An example in a case where the operator identification process is performed by communication with a terminal device such as a portable information device, which operates the picture display device 100 is described below.

Figure 7:
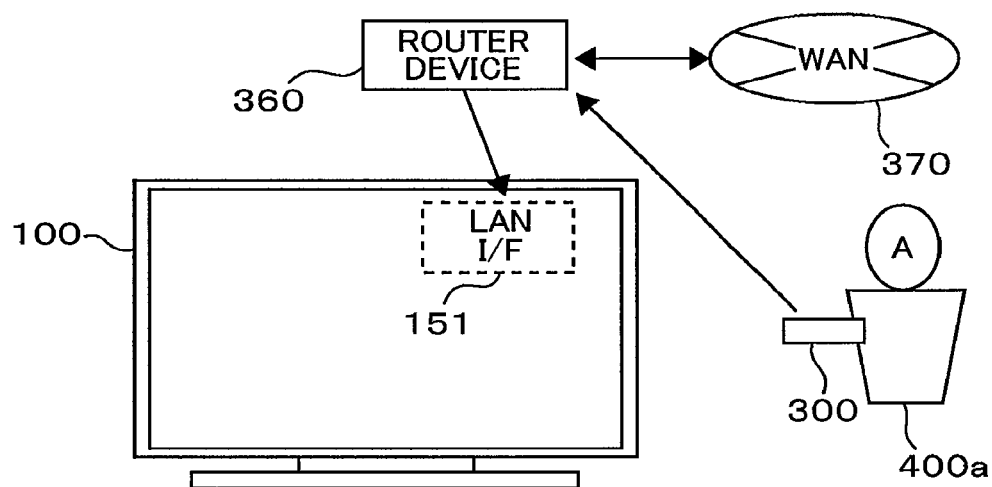
FIG. 7 is a schematic diagram explaining an operator identification process according to an example.

For example, in a case where a portable information terminal 300 owned by a person A (400*a*) is the operator of the picture display device 100, as shown in FIG. 7, the portable information terminal device 300 transmits a control command and operator information to the picture display device 100 via a router device 360 in accordance with an operation by the person A (400*a*). On the other hand, in the picture display device 100, the main control unit 101 interprets and executes the transmitted control command, and simultaneously the operator identification unit 142 performs an operator identification process using the transmitted operator information.

Figure 8:
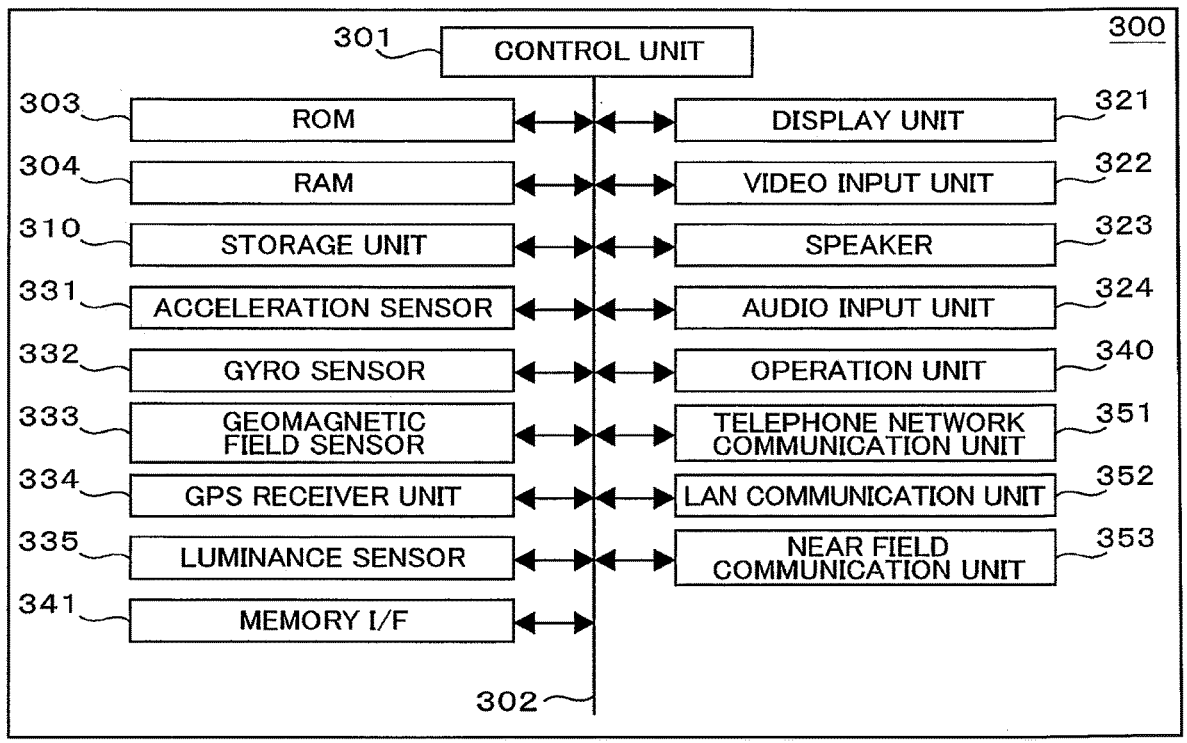
FIG. 8 is a block diagram of a portable information terminal according to an example.

More specifically, in a case where the portable information terminal 300 of this example has a structure shown in the block diagram of FIG. 8, the person A (400*a*) operates an operation unit 340 of the portable information terminal 300 (for which communication with the picture display device 100 has been established by an authentication process with the picture display device 100) in which an application for picture display device control is running, so that first a main control unit 301 converts that operation into a control command for the picture display device 100. Then, the main control unit 301 transmits operator information for making the portable information terminal 300 be identified as the operator of the picture display device 100 in the operator identification process in the operator identification unit 142, from a LAN communication unit 352 by superimposing it on the control command.

In the picture display device 100, the LAN interface 151 receives the control command on which the operator information is superimposed, transmitted via the router device 360, and the main control unit 101 interprets and executes the received control command. At the same time, the operator identification unit 142 extracts the operator information from the received control command on which the operator information is superimposed, and performs a process of comparing the extracted operator information with operator information stored in advance in the individual information storage area 131. In a case where the operator information of the portable information terminal 300 has already registered in the individual information storage area 131, the operator identification unit 142 can identify the operator of the picture display device 100 as the portable information terminal 300 by the aforementioned comparison process.

The operator information may be data of the portable information terminal 300 such as a product name or a model number, or data such as a product number or a serial number thereof. In a case where the portable information terminal 300 has a telephone communication function, the operator information may be a telephone number used in the telephone communication function or other unique number data associated with that telephone number. The operator information may be a keyword, a pass code, or an owner number which is arbitrarily determined by the owner of the portable information terminal 300, for example. Moreover, the operator information may be stored in the ROM 303, the RAM 304, or the storage unit 310, or may be stored in a memory card (not shown) connected to a memory interface 341. Furthermore, owner data stored in a data server or the like on the Internet in association with the telephone number or the unique number may be downloaded to be used as the operator information.

In addition, it is desirable that the portable information terminal 300 has a user authentication function for authenticating the owner of the portable information terminal 300 and makes the operator information effective (available for transmission) only when the authentication of the owner of the portable information terminal 300 by the user authentication function is successful.

The process of authenticating the owner of the portable information terminal 300 may be performed by inputting a password or a pass code to the operation unit 340. Alternatively, the authentication process may be carried out by face recognition by inputting a face image to a video input unit 322 or other image recognition. The authentication process may be carried out by speech recognition by an audio input to an audio input unit 324, voiceprint analysis, or a sound source analysis by inputting a sound generated by musical instrument performance, a popular song or the like. Alternatively, the authentication process may be performed by fingerprint identification by inputting a fingerprint to a fingerprint input unit which is not shown. The authentication process may be performed by biometric authentication which identifies a palm print, an iris, veins or the like. The authentication process may be performed by touch authentication in which predetermined positions on a touch panel arranged on the operation unit 340 are touched in a predetermined order.

By providing the portable information terminal 300 with the user authentication function in this manner, it is possible to prevent someone different from the owner of the portable information terminal 300 from using the operator information of the portable information terminal 300.

Figure 9:
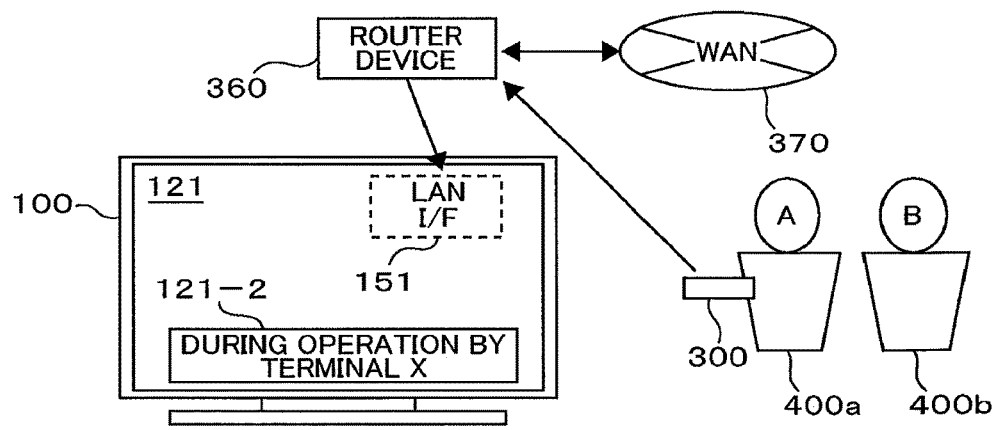
FIG. 9 is a screen diagram explaining an OSD massage for clearly showing an operator according to an example.

In a case where the portable information terminal 300 is identified as the operator of the picture display device 100 by the operator identification process, when an operation by the portable information terminal 300 is performed for the picture display device 100, an OSD message 121-2 indicating the portable information terminal 300 is operating the picture display device 100 may be displayed, as shown in FIG. 9.

Moreover, by further storing information indicating that the owner of the portable information terminal 300 having the aforementioned operator information is the person A (400*a*) in the individual information storage area 131, the operator identification unit 142 can indirectly identify the person A (400*a*) as the person using the portable information terminal 300 which is the operator of the picture display device 100.

In this case, when the portable information terminal 300 is identified as the operator of the picture display device 100 by the operator identification process and an operation of the picture display device 100 is performed by the portable information terminal 300, the OSD message 121-1 indicating that the person A (400*a*) is operating the picture display device 100 may be displayed.

A timing at which the picture display device 100 displays the OSD message 121-2 or the OSD message 121-1 may be every time the portable information terminal 300 has transmitted the control command to the picture display device 100 in accordance with the operation by the person A (400a) or may be only a timing at which a predetermined operation (e.g., an operation related to a settings change of the picture display device 100) has been carried out.

The operator identification process may be performed only at a predetermined timing (e.g., when the picture display device 100 is turned on, when the picture display device 100 resumes from its sleeping state, or when communication between the picture display device 100 and the portable information terminal 300 is established). Alternatively, the operator identification process may be performed every time the picture display device 100 receives the control command from the portable information terminal 300 or may be performed regularly at a predetermined time interval. The operator identification process may be performed by a request of transmission of the operator information from the picture display device 100 to the portable information terminal 300

Next, an exemplary case is described below in which the aforementioned operator identification process is performed by storing operator information in the remote controller 200 in advance.

Figure 10:
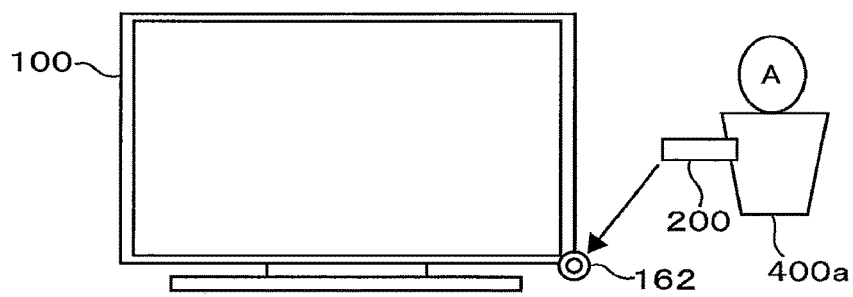
FIG. 10 is a schematic diagram explaining an operator identification process according to an example.

For example, in a case where a person A (400a) is the operator who operates the picture display device 100 by using the remote controller 200, as shown in FIG. 10, the person A (400a) stores operator information for making the person A be identified in the remote controller 200 in advance. Moreover, the remote controller 200 transmits a control command and the operator information to the picture display device 100 in accordance with an operation by the person A (400a). On the other hand, in the picture display device 100, the main control unit 101 interprets and executes the transmitted control command, and the operator identification process is carried out by the operator identification unit 142 by using the transmitted operator information.

An exemplary method for storing the operator information for making the picture display device 100 identify the person A (400a) in the remote controller 200 in advance is described below.

Figure 11:
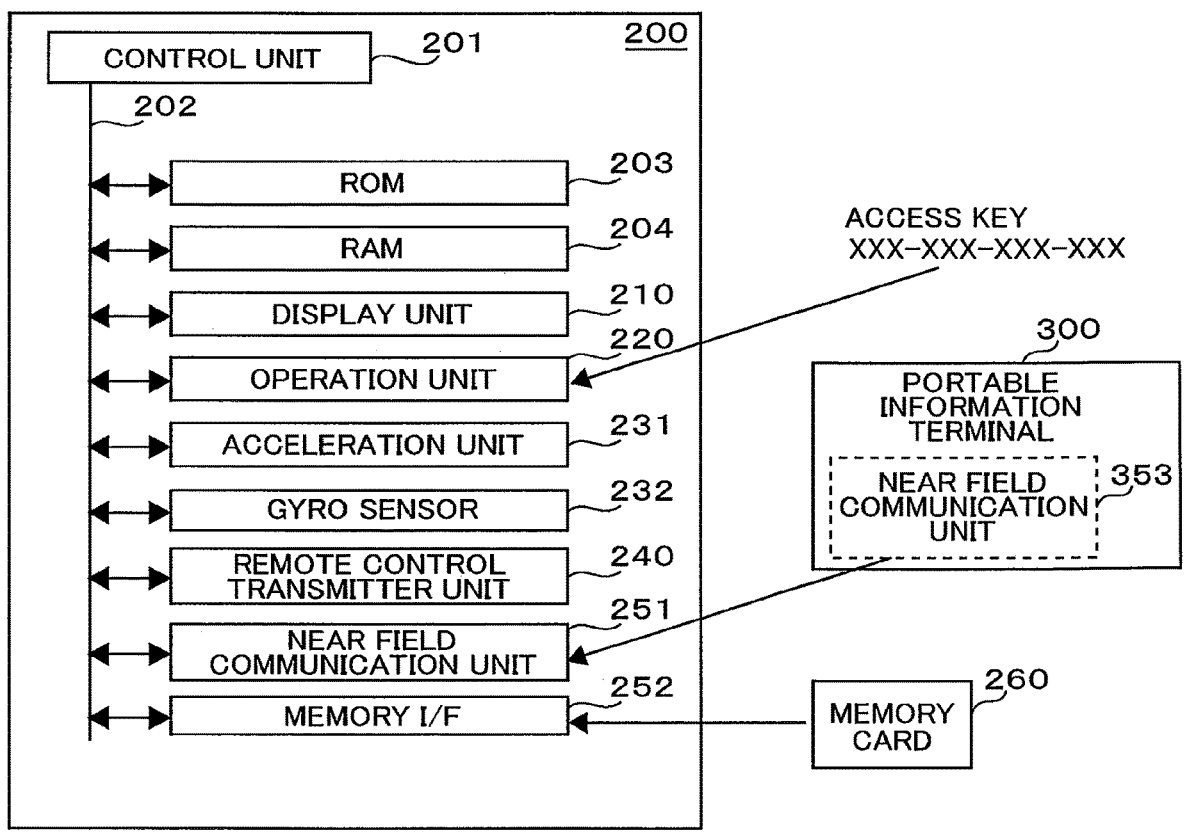
FIG. 11 is a block diagram of a remote controller according to an example.

For example, in a case where the remote controller 200 of this example is configured as shown in the block diagram shown in FIG. 11, the person A (400a) may input a predetermined access key (operator information) which is determined and stored in advance by the person A in the individual information storage area 131, from the operation unit 220 of the remote controller 200 so that the access key is stored in the RAM 204. Alternatively, the person A (400a) may bring the portable information terminal 300 owned thereby close to the remote controller 200 to establish communication between a near field communication unit 353 of the portable information terminal 300 and a near field communication unit 252 of the remote controller 200 so that the remote controller 200 reads out the operator information that the portable information terminal 300 has and stores it in the RAM 204. Alternatively, the person A (400a) may connect a memory card 260 (or an item similar to the memory card) in which predetermined identification information (operator information) determined and stored by the person A (400a) in advance in the individual information storage area 131 is recorded to a memory interface 252 of the remote controller 200.

When the person A (400a) operates the operation unit 220 of the remote controller 200 in which any of the aforementioned types of operator information is stored by the aforementioned process, the main control unit 201 superimposes the any of the aforementioned types of operator information on a control command for controlling the picture display device 100 and transmits it as an infrared ray signal from the remote control transmitter unit 240.

In the picture display device 100, the control command with the operator information superimposed thereon is received by the remote control receiver unit 162, and the main control unit 101 interprets and executes the control command. At the same time, the operator identification unit 142 extracts the any of the aforementioned operator information from the control command with the operator information superimposed thereon, and carries out a process of comparing the extracted operator information with the operator information stored in advance in the individual information storage area 131. In a case where the person A (400a) has registered operator information for making the person A be identified in the individual information storage area 131 in advance, the operator identification unit 142 can identify the operator of the picture display device 100 as the portable information terminal 300 by that comparison process.

In a case where a person different from the person A (400a) uses the remote controller 200, that different person newly performs the process of storing operator information for making that different person be identified in the remote controller 200. This enables the operator identification process to be carried out even in a case where more than one person watch the picture display device 100 and share the remote controller 200, for example.

The aforementioned operator identification process may be performed every time the picture display device 100 receives the control command from the remote controller 200, or may be performed by regular transmission of the operator information to the picture display device 100 performed by the remote controller 200 at a predetermined time interval, independently of the operation by the person A (400a).

The examples of the operator identification process are described above, using the drawings. The methods described in the aforementioned examples may be used in combination, instead of being used solely. The operator identification process may be performed by using a different method from the aforementioned examples. As a different method for the operator identification process, a biometric authentication process which confirms a fingerprint, a palm print, veins, an iris, or the like, and inputting a login password and the like are considered.

Figure 12:
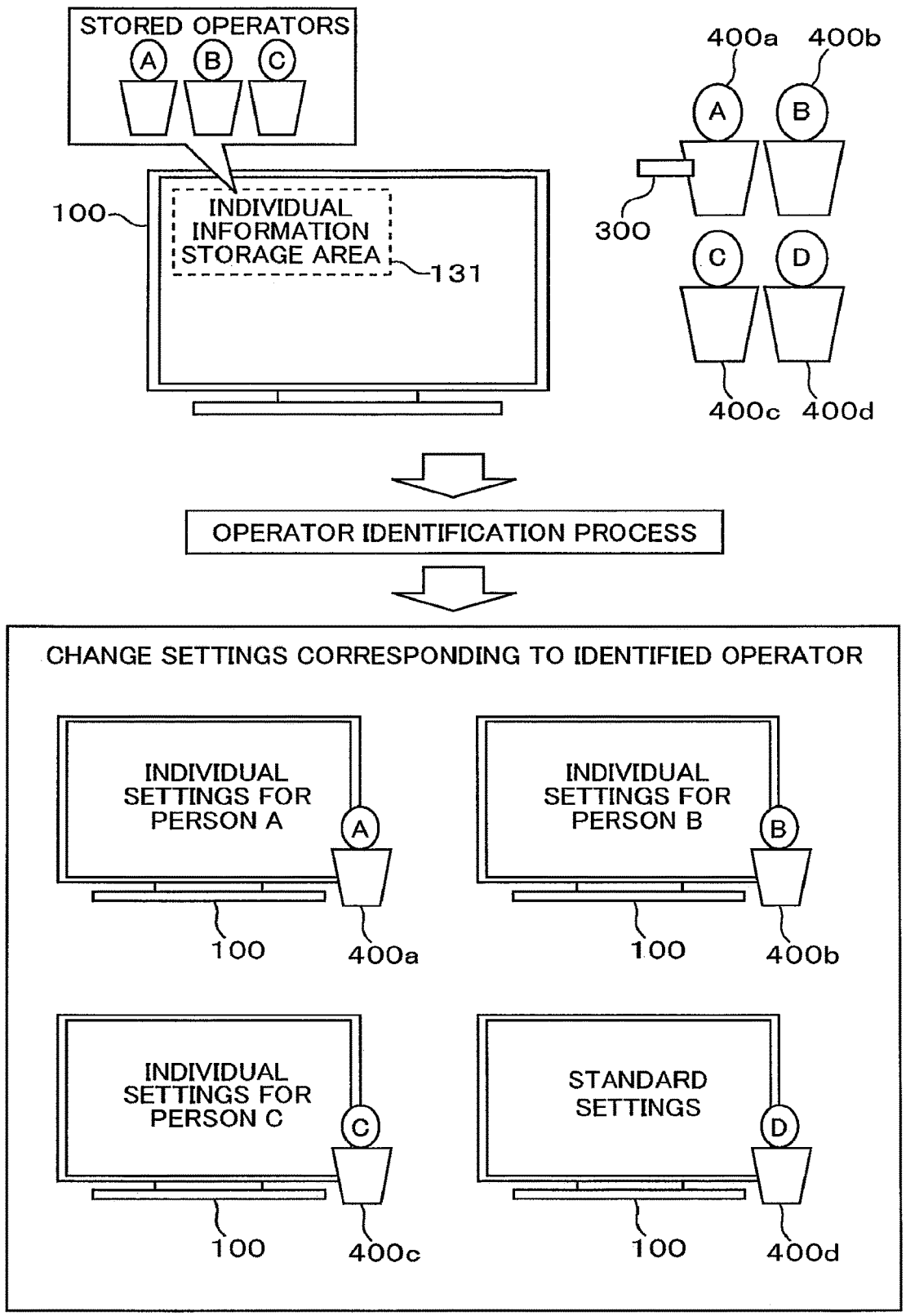
FIG. 12 is a schematic diagram explaining a settings change process performed in accordance with an operator identified in the operator identification process, according to an example.
Figure 13:
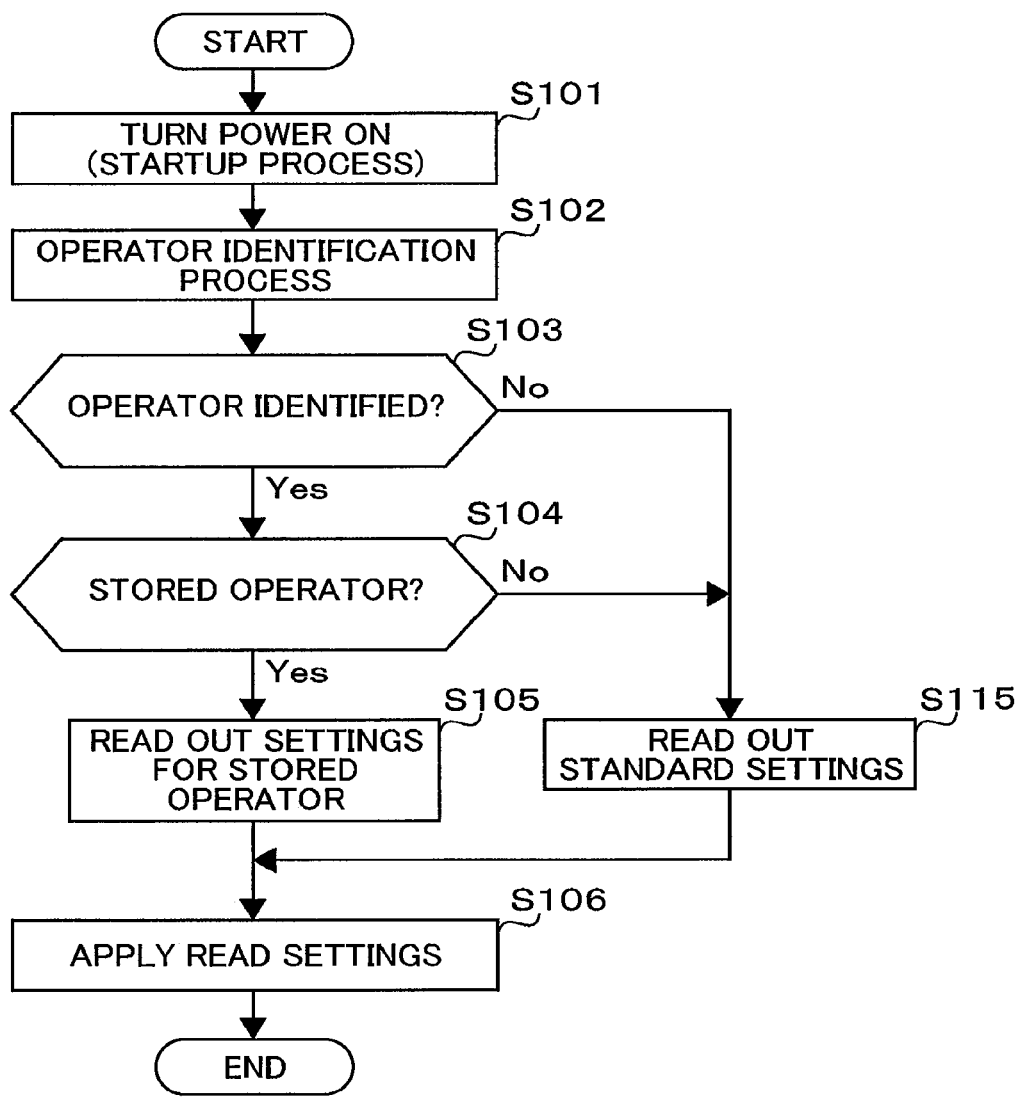
FIG. 13 is a flowchart explaining the settings change process performed in accordance with the operator identified in the operator identification process, according to an example.

The picture display device 100 of this example further performs a settings change process of applying the individual settings for each operator in accordance with the operator identified by the aforementioned operator identification process. FIGS. 12 and 13 are a diagram and a flowchart for explaining the settings change process performed by the picture display device 100 in accordance with the operator identified by the operator identified process.

It is assumed that the picture display device 100 shown in FIG. 12 stores, as operator information of an operator of the picture display device 100 and individual settings for that operator, operator information of a person A (400a) and individual settings for the person A (400a), operator information of a person B (400b) and individual settings for the person B (400b), and operator information of a person C (400c) and individual settings for the person C (400c) to be associated with each other in the individual information storage area 131 in advance.

In this state, when the picture display device 100 is turned on by means of a terminal device such as a remote controller or a portable information terminal (S101), the main control unit 101 of the picture display device 100 performs a startup process such as initialization of the respective components, and at the same time the operator identification unit 142 performs an operator identification process (S102). In the operator identification process performed in S102, the methods described in the aforementioned examples may be used, for example. In the operator identification process in S102, when identification of an operator is successful (S103) and it is confirmed that the identified operator has been stored as the operator of the picture display device 100 in advance (S104), i.e., when operator information of a person operating the picture display device 100 or a terminal device used for operating the picture display device 100 coincides with operator information stored in the individual information storage area 131, the main control unit 101 reads out the individual settings for the operator thus identified from the individual information storage area 131 (S105) and applies the read individual settings (S106).

For example, in a case where the person A (400a) is identified as the operator of the picture display device 100 by a series of processes from S102 to S104, the main control unit 101 reads out the individual settings for the person A (400a) stored in association with the operator information of the person A (400a) in the individual information storage area 131 and applies it. Similarly, the main control unit 101 reads out from the individual information storage area 131 and applies the individual settings for the person B (400b) in a case where the person B (400b) is identified as the operator of the picture display device 100, and reads out from the individual information storage area 131 and applies the individual settings for the person C (400c) in a case where the person C (400c) is identified.

On the other hand, in a case where identification of the operator is unsuccessful in a series of processes from S102 to S103, or a case where identification of the operator is successful in a series of processes from S102 to S104, but the operator information of the identified operator is not confirmed as being stored in the individual information storage area 131 (e.g., a case where the person identified in the operator identification process is a person D (400d), or a case where the operator information of the identified terminal device is not stored in the individual information storage area 131), the main control unit 101 reads out standard settings provided in the picture display device 100 from the ROM 103 (S115) and applies the read standard settings (S106).

Figure 14A:
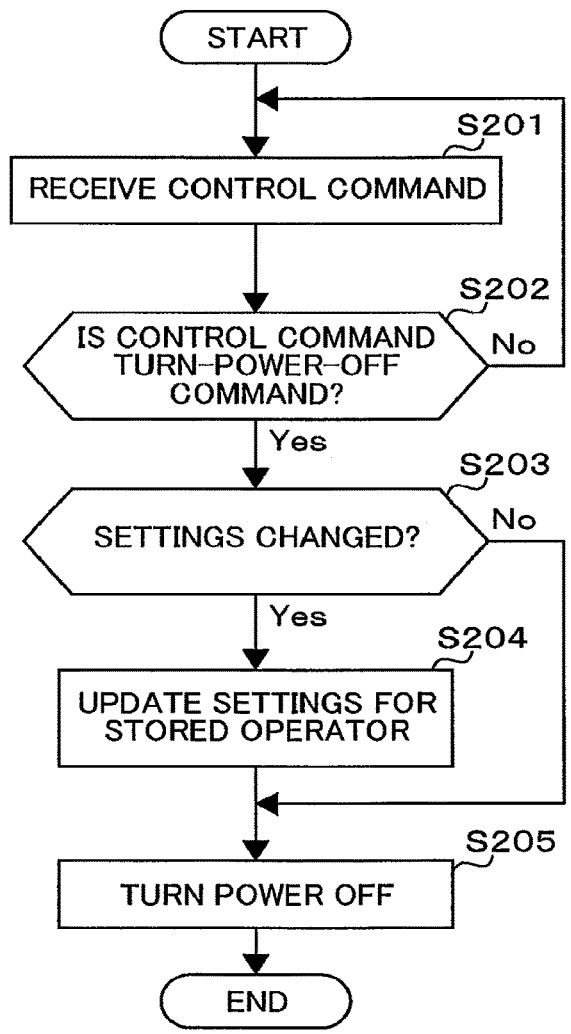
FIGS. 14A and 14B are flowcharts explaining a process of updating individual settings and a process of storing new operator information, respectively, according to an example.
Figure 14B:
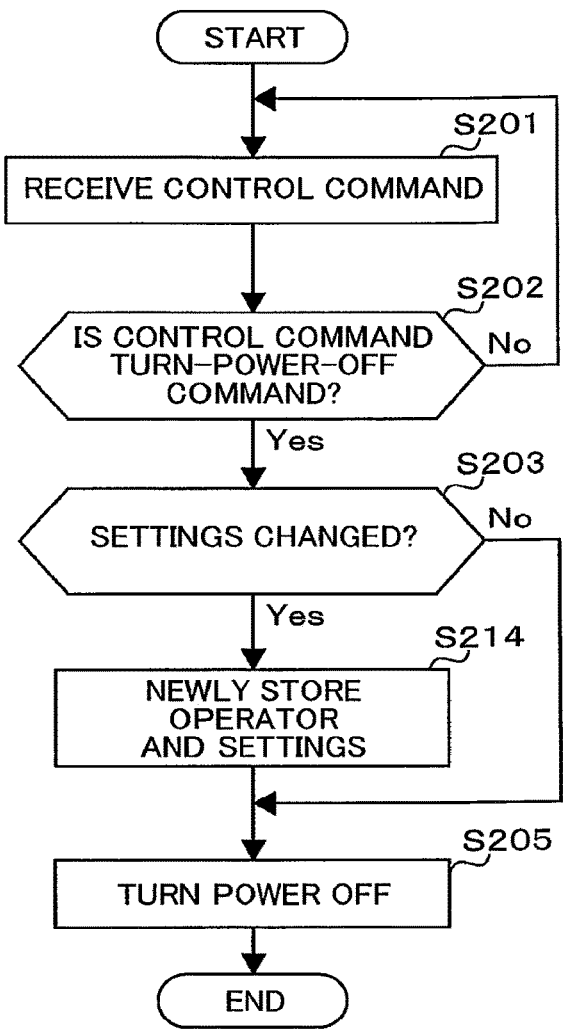

When the picture display device 100 of this example is turned off and when the operator is changed during operation, the picture display device 100 performs a process of updating the individual settings for each operator stored in the individual information storage area 131 (in a case where the process of S105 is selected during execution of the flowchart shown in FIG. 13) or a process of newly storing operator information of a new operator and individual settings for the new operator in the individual information storage area 131 (in a case where the process of S115 is selected during execution of the flowchart shown in FIG. 13) as necessary. FIG. 14 is a flowchart explaining the process of updating the individual settings for each operator stored in the individual information storage area 131 (FIG. 14(A)) and the process of newly storing the operator information of the new operator and the individual settings for the new operator in the individual information setting area 131 (FIG. 14(B)), to be performed when the picture display device 100 is turned off.

When a control command is transmitted from the terminal device such as the remote controller or the portable information terminal while the picture display device 100 is waiting for the control command, the picture display device 100 receives the control command at the remote control receiver unit 162 or the LAN interface 151 (S201). Then, the main control unit 101 confirms whether or not the received control command is a power-off command (S202). In a case where the control command received in S201 is not the power-off command, the main control unit 101 executes the received control command and then the picture display device 100 returns to the state for waiting the control command.

On the other hand, in a case where the control command received in S201 is the power-off command, the main control unit 101 reads out and applies the individual settings for each operator or the standard settings provided in the picture display device 100 and thereafter confirms whether or not the settings of the picture display device 100 are changed by the operator (S203). When it is determined that the settings are changed in S203, the main control unit 101 executes the process of updating the individual settings for each operator stored in the individual information storage area 131 (S204: in a case where the process of reading out and applying the individual settings for each operator is performed) or the process of newly storing the operator information of the new operator and the individual settings for the new operator in the individual information storage area 131 (S214: in a case where the process of reading out and applying the standard settings provided in the picture display device 100 is performed). Moreover, after execution of the process of S204 or S214, the main control unit 101 executes a termination process for turning the picture display device 100 off (S206).

In a case where it is determined that the settings are not changed in S203, the picture display device 100 may execute the termination process for turning it off without executing the process of S204 or S214.

When the operator of the picture display device 100 is changed during operation, first, the processes similar to S203 and S204 in FIG. 14(A) (in a case where the process of reading out and applying the individual settings for each operator is performed) or the processes similar to S203 and S214 in FIG. 14(B) (in a case where the process of reading out and applying the standard settings provided in the picture display device 100 is performed) are performed. Then, in accordance with a newly identified operator, the processes similar to S105 and S106 in FIG. 13 (in a case where the operator information of the newly identified operator is stored in the individual information storage area 131 in advance) or the processes similar to S115 and S106 in FIG. 13 (in a case where the operator information of the newly identified operator is not stored in the individual information storage area 131) may be performed.

By the above processes, the picture display device 100 of this example can perform the settings change process of automatically applying the individual settings for the operator identified in the aforementioned operator identification process in accordance with that operator.

The aforementioned example is described, assuming that the individual settings for each operator are stored in the individual information storage area 131 of the picture display device 100. However, in a different example, the individual settings for each operator may be stored in the storage unit 310 of the portable information terminal 300.

In this case, when in a series of processes from S102 to S104 identification of the operator is successful and the operator information of the operator thus identified is confirmed as being stored in the individual information storage area 131, the main control unit 101 may apply the individual settings for the identified operator which are acquired from the storage unit 310 of the portable information terminal 300 by communication via the LAN interface 151.

In a case where the portable information terminal 300 is operated to change the settings of the picture display device 100, the main control unit 301 can recognize the content of the settings change performed in the picture display device 100. Thus, in a case where the individual settings for each operator are stored in the storage unit 310 of the portable information terminal 300, it is possible to perform the process of updating the individual settings for each operator or the process of newly storing the individual settings for the new operator without acquiring information related to the content of the settings change performed in the picture display device 100 by communication with the picture display device 100.

In a case where the picture display device 100 is a display device with a touch panel, such as an electronic blackboard device with a touch panel, the settings change of the display device with the touch panel can be performed by an operation of the touch panel, not by an operation of the portable information terminal 300. In this case, in the process of updating the individual settings for each operator or the process of newly storing the individual settings for the new operator, the main control unit 301 acquires information related to the content of the settings change, performed in the display device with the touch panel, by communication with the display device with the touch panel in the process of S204 or S214 in FIG. 14.

An item which the picture display device 100 of this example can set in the individual settings for the operator applied in accordance with the operator identified in the operator identification process is described below, referring to examples.

In a case where the picture display device 100 is a television device for digital broadcast reception, items such as the picture quality, the sound quality, and the operation mode when a digital broadcast program is watched are usually changeable in accordance with the preference. Thus, also in the picture display device 100 of this example, settings related to the picture quality such as brightness, a black level, a tint, and color darkness of the picture, settings related to the sound quality such as loudness in each sound range, settings related to the operation of the device such as an operation mode of a frame rate conversion circuit included therein, brightness of a backlight, and on/off of a power saving mode, may be stored as the individual settings for each operator in the individual information storage area 131, for example.

By doing this, it is possible for the picture display device 100 of this example to identify an operator by the aforementioned operator identification process and read out and apply the individual settings for the identified operator, such as the picture quality settings, the sound quality settings, and the operation settings of each device, stored in advance in the individual information storage area 131 in accordance with the identified operator. Thus, a person operating the picture display device 100 or a person operating a terminal device used for operating the picture display device 100 can apply and use the settings of the picture quality, the sound quality and the like, which are set to correspond to the preference thereof to the picture display device 100 without being affected by the settings change performed by another person.

Figure 15:
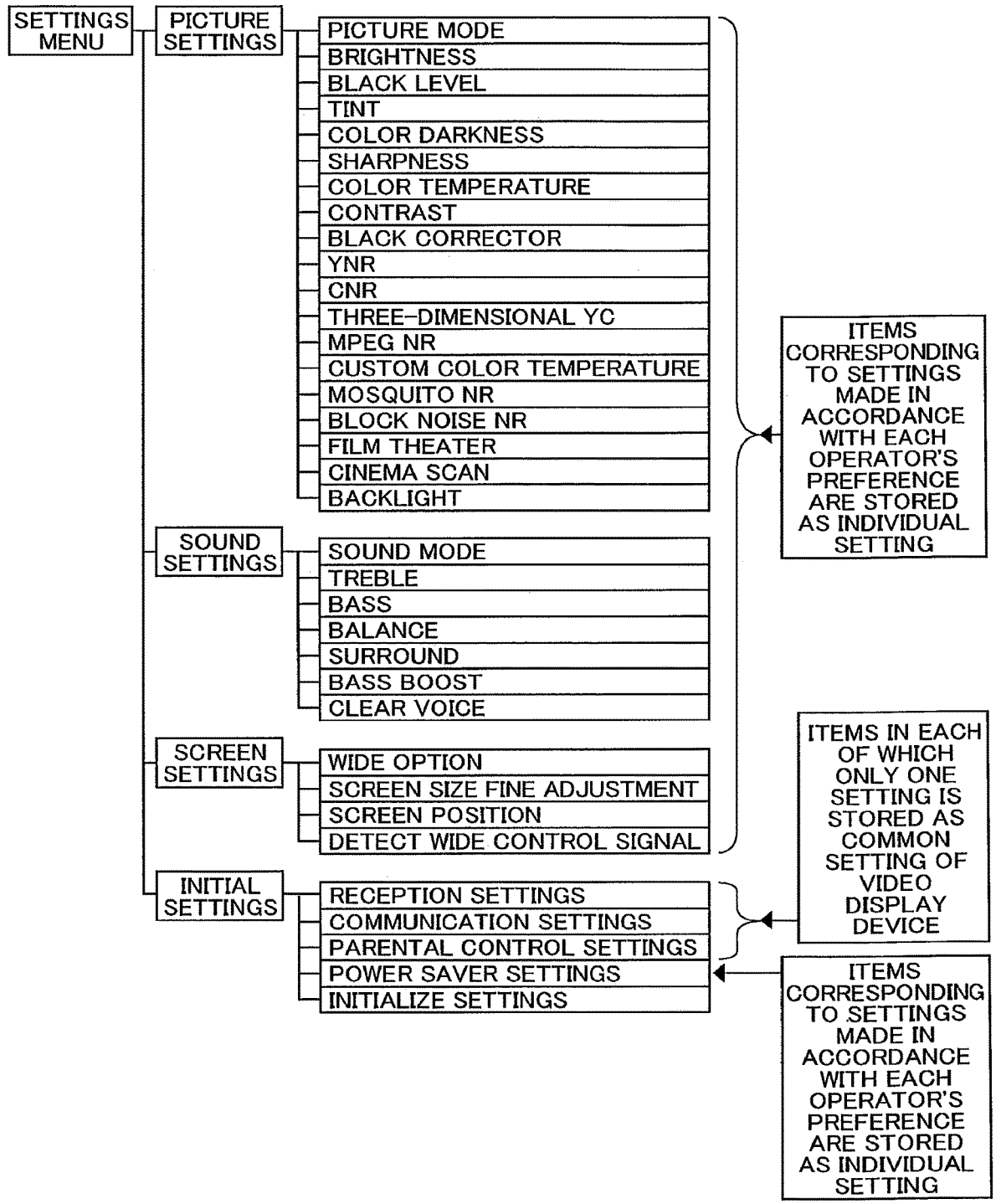
FIG. 15 is a schematic diagram explaining a settings menu structure of the picture display device according to an example.

However, it is not necessary to store all the items which can be set by an instruction of the operator of the picture display device 100 as the individual settings for each operator in the individual information storage area 131. For example, in a case where the settings menu structure of the picture display device 100 of this example is that shown in FIG. 15, it is desirable that for respective items in the "picture settings" and the "sound settings" the contents of the settings set in accordance with the preference of each operator are stored as the individual settings in the individual information storage area 131. On the other hand, for items of "receiving settings", items of "communication settings", or the like which are lower order than "initial settings", only one set of setting contents may be stored as common settings of the picture display device 100 in the other information storage area 133 or the like, instead of storing those as the individual settings for each operator in the individual information storage area 131.

That is, in this example, the settings in the items of the "receiving settings" are those related to an area in which the picture display device 100 is used, those related to broadcasting stations available in that area, and the like, but are not usually items for which the settings are changed in accordance with the preference of each operator. Moreover, the settings in the items of the "communication settings" are settings related to an IP (Internet Protocol) address, a subnet mask, a default gateway of the LAN interface 151 of the picture display device 100 and the settings related to a DNS (Domain Name System) server, for example, and do not have to be changed frequently after being set once immediately after installation of the picture display device.

Therefore, by not storing the contents of the settings related to the items of the "receiving settings" and the items of the "communication settings" as the individual settings for each operator in the individual information storage area 131, it is possible to reduce a required capacity of the individual information storage area 131.

In a case where the picture display device 100 is a television device including therein a function of recording/reproducing a digital broadcast program, the device 100 usually has a function of displaying recorded digital broadcast programs in a list. Thus, also in the picture display device 100 of this example, settings of an initially displayed position when the list of the recorded programs are displayed, for example, may be stored as the individual settings for each operator in the individual information storage area 131.

Figure 16:
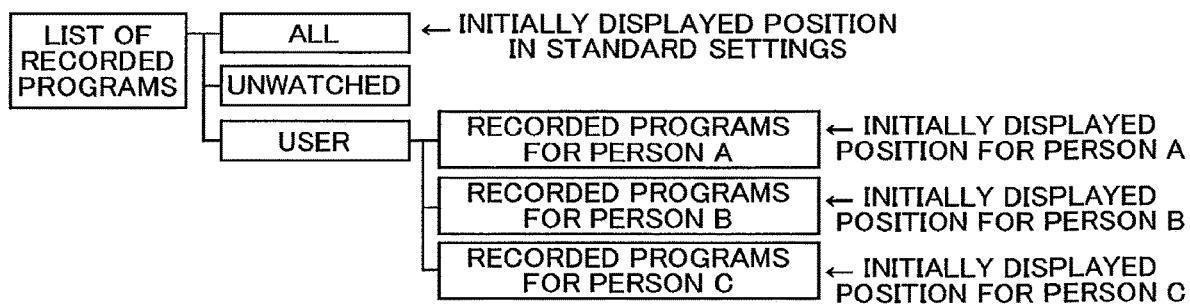
FIG. 16 is a schematic diagram explaining individual settings related to displaying recorded contents according to an example.

For example, it is assumed that a folder structure in the list of the recorded programs displayed by the picture display device 100 of this example has a structure shown in FIG. 16 and three people including a person A, a person B, and a person C use the picture display device 100 of this example and each of three records a digital broadcast program. In this case, when the picture display device 100 of this example identifies the person A as the operator by the aforementioned operator identification process, the individual settings for the person A are read out from the individual information storage area 131 and are applied, thereby the settings are changed so that the initially displayed position is set to a "recorded programs for person A" folder in a lower layer of a "user" folder in the list display of the recorded programs. Similarly, when the person B is identified as the operator by the aforementioned operator identification process, the initially displayed position is set to a "recorded programs for person B" folder in a lower layer of the "user" folder. When the operator information of the operator identified by the aforementioned operator identification process is not stored in the individual information storage area 131, the standard settings are read out from the ROM 103 and are applied, thereby the settings are changed so that the initially displayed position is set to an "all" folder in the list display of the recorded programs. Alternatively, the list display may not be allowed.

By doing this, in a case where a person operating the picture display device 100 of this example or a person operating a terminal device used for operating the picture display device 100 requests the list display of the recorded programs to the picture display device 100, it is possible to quickly display the folder in which the programs recorded by that person are stored, and to easily confirm the contents therein.

Figure 17:
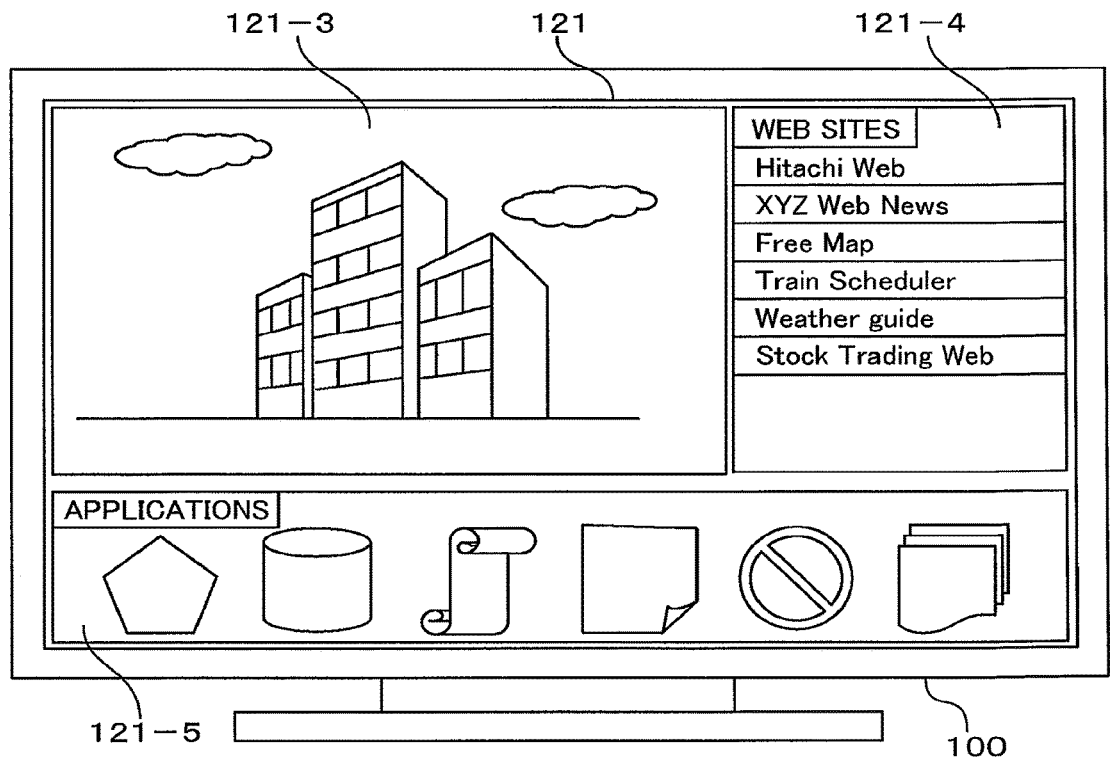
FIG. 17 is a schematic diagram explaining settings related to a display layout according to an example.

In a case where the picture display device 100 is a television device having a function of connecting to a network such as the Internet and functions of performing a search in the network and executing another application, it is possible to simultaneously display a digital broadcast program picture window 121-3, a URL (Uniform Resource Locator) for internet access list window 121-4, an icon list window 121-5 for icons of applications executable in the picture display device 100, for example, on the display unit 121, as shown in FIG. 17. Moreover, in the picture display device 100 of this example, respective displayed positions of the digital broadcast program picture window 121-3, the URL for internet access list window 121-4, and the application icon list window 121-5 can be arranged freely, and a layout such as the displayed position of each window may be stored as the individual settings for each operator in the individual information storage area 131.

Moreover, each operator may set an initially displayed channel in the digital broadcast program picture window 121-3, a preferred URL in the URL for internet access list window 121-4, and an icon of a frequently used application in the application icon list window 121-5, for example, in accordance with the preference thereof, and those may be stored as the individual settings for each operator in the individual information storage area 131.

By doing this, it is possible for the picture display device 100 of this example to identify an operator by the aforementioned operator identification process and to read out and apply the individual settings for the identified operator such as the displayed positions of the windows, the initially displayed channel, the preferred URL, and the icon of the frequently used application, stored in advance in the individual information storage area 131, in accordance with the identified operator. Thus, a person operating the picture display device 100 or a person operating a terminal device used for operating the picture display device 100 can use the picture display device 100 with a window layout, which is set to correspond to the preference thereof, without being affected by the settings change performed by another person.

In a case where the picture display device 100 is a television device which can display a picture content accumulated in a content server connected to a network such as the Internet, it is possible to download the picture content from the content server and accumulate it or to purchase a paid picture content on the content server and view a video stream thereof. Moreover, it is desirable that not only the picture display device 100 can display a number of picture contents on the content server in a list, but also the device 100 has a function of displaying the downloaded picture contents only in a list or a function of displaying the purchased picture contents only in a list. In this case, the picture display device 100 of this example may store the list of the picture contents downloaded by each operator or the list of the picture contents purchased by each operator, for example, as the individual settings for each operator in the individual information storage area 131.

By this, the picture display device 100 of this example identifies the operator by the aforementioned operator identification process, thereby the list of the picture contents downloaded by the identified operator or the list of the purchased picture contents can be read out from the individual information storage area 131. Thus, when a person operating the picture display device 100 or a person operating a terminal device used for operating the picture display device 100 requests the picture display device 100 to display the list of the downloaded picture contents or the list of the purchased picture contents, it is possible to extract and display the picture contents downloaded by that person or the picture contents purchased by that person only, from among a large number of picture contents.

The exemplary embodiment of the present invention is described above. The structure implementing the techniques of the present invention is not limited to the aforementioned examples. Moreover, a numerical value, a message text, and the like in the description and the drawings are mere examples, and the use of a different one does not damage the effects of the present invention.

All or a portion of the aforementioned functions or the like of the present invention may be implemented by hardware, e.g., by being designed by an integrated circuit. Moreover, a microprocessor or the like may interpret and execute a program implementing each function or the like, thereby all or a portion of the aforementioned functions or the like of the present invention are implemented by software. The aforementioned program may be stored in the ROM 103 or the other information storage area 133 of the storage unit 130 of the picture display device 100 in advance, or may be acquired from an application server on the Internet via the LAN interface 151. The aforementioned program stored in a memory card may be acquired via the USB interface 154.

As a control line or an information line in the drawings, the one required for the description is shown. All of control lines and information lines in a product are not necessarily shown. It can be considered that almost all components are actually connected with each other.

Reference Signs List

100: picture display device
101: main control unit
102: system bus
103: ROM
104: RAM
110: broadcast receiver unit
111: tuner
112: splitter unit
113: video decoder
114: audio decoder
115: information decoder
121: display unit
122: display processing unit
123: speaker
124: audio processing unit
130: storage unit
131: individual information storage area
132: program storage area
133: other information storage area
141: video input unit
142: operator identification unit 143: audio input unit
150: external interface
151: LAN interface
152: audio input unit
153: video input/output unit
154: USB interface
160: operation unit
161: operation key
162: remote control receiver unit
200: remote controller
201: main control unit
202: system bus
203: ROM
204: RAM
210: display unit
220: operation unit
231: acceleration sensor
232: gyro sensor
240: remote control transmitter unit
251: near field communication unit
252: memory interface
260: memory card
300: portable information terminal
301: main control unit
302: system bus
303: ROM
304: RAM
310: storage unit
321: display unit
322: video input unit
323: speaker
324: audio input unit
331: acceleration sensor
332: gyro sensor
333: earth magnetic field sensor
334: GPS receiver unit
335: luminance sensor
340: operation unit
341: memory interface
351: mobile telephone network communication unit
352: LAN communication unit
353: near field communication unit
360: router device
370: WAN (Wide Area Network)

What is claimed:

1. A picture display apparatus capable of displaying a content, the picture display apparatus comprising:
a network interface that can communicate with a portable information terminal via a first network and acquire the content via a second network;
a display capable of displaying the content and displaying a content list of the content capable of being acquired via the second network; and
a controller,
wherein content list settings information related to the content list and operator information related to an operator of the picture display apparatus are stored in a storage in association with each other,
wherein information of a plurality of content lists are included in the content list settings information,
wherein the controller communicates with the portable information terminal via the first network, acquires an operator information stored in the portable information terminal in advance from the portable information terminal, and conducts operator recognition processing by using the acquired operator information and the operator information stored in the storage,
wherein, when the controller recognizes that the operator information acquired from the portable information terminal is the operator information related to the operator stored in the storage, the controller performs a first control which controls the display to display a content list based on the content list settings information associated with the operator information of the recognized operator, while when the controller determines that the operator information acquired from the portable information terminal is not the operator information related to the operator stored in the storage, but is operator information regarding a new operator,
the controller performs a second control which controls the display to display the content list based on standard content list settings information,
in the second control, when the content list based on the standard setting information is changed by the new operator, the changed setting information is associated with operator information of the new operator and stored in a storage, and
when the content list based on the standard setting information is not changed by the new operator, the operator information of the new operator is not stored in the storage.

2. The picture display apparatus according to claim 1, wherein:
the content capable of being acquired via the second network includes paid content on a content server, which can be viewed via a video stream.

3. The picture display apparatus according to claim 1, wherein:
in a case that the content list settings information for the content capable of being acquired via the second network is changed, a storing process for storing the changed content list settings information into the storage is performed before a termination process for turning the picture display apparatus off.

4. The picture display apparatus according to claim 1, wherein:
the operator information is information associated with the telephone number of the portable information terminal.

5. The picture display apparatus according to claim 1, wherein:
the operator information is a keyword or a passcode that is arbitrarily determined by the owner of the portable information terminal.

6. The picture display apparatus according to claim 1, wherein:
the network interface is connected to the portable information terminal via a router.

7. The picture display apparatus according to claim 1, wherein:
the network interface is connected to the internet via a router.

8. The picture display apparatus according to claim 1, wherein:
when the operator is identified by the operator identification process, the controller displays an indication of the operator on a display.

9. The picture display apparatus according to claim 1, wherein:
the portable information terminal is a smartphone.

* * * * *